US011067325B2

(12) United States Patent
Yang et al.

(10) Patent No.: US 11,067,325 B2
(45) Date of Patent: Jul. 20, 2021

(54) REFRIGERATION CYCLE OPTIMIZATION

(71) Applicant: Hitachi-Johnson Controls Air Conditioning, Inc, Tokyo (JP)

(72) Inventors: Liming Yang, Mequon, WI (US); Matthew J. Asmus, Watertown, WI (US)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 130 days.

(21) Appl. No.: 16/442,093

(22) Filed: Jun. 14, 2019

(65) Prior Publication Data

US 2020/0393181 A1 Dec. 17, 2020

(51) Int. Cl.
F25B 49/02 (2006.01)
F25B 7/00 (2006.01)

(52) U.S. Cl.
CPC ............ F25B 49/022 (2013.01); F25B 7/00 (2013.01); F25B 2500/05 (2013.01); F25B 2600/022 (2013.01)

(58) Field of Classification Search
CPC .... F25B 49/022; F25B 7/00; F25B 2600/022; F25B 2500/05
See application file for complete search history.

(56) References Cited

U.S. PATENT DOCUMENTS

| 7,905,103 | B2 | 3/2011 | Larsen et al. | |
| 9,982,903 | B1* | 5/2018 | Ridder | F24F 11/0001 |
| 2005/0005619 | A1* | 1/2005 | Kojima | F24F 11/30 62/132 |
| 2011/0016893 | A1* | 1/2011 | Dawes | F25B 49/02 62/89 |
| 2012/0022702 | A1* | 1/2012 | Jang | F24F 11/62 700/277 |
| 2012/0153725 | A1* | 6/2012 | Grohman | H02J 3/14 307/39 |
| 2015/0300675 | A1* | 10/2015 | Hamada | F24F 3/065 62/203 |
| 2016/0245536 | A1* | 8/2016 | Iwasaki | F24F 11/62 |
| 2017/0292726 | A1* | 10/2017 | Sato | G06F 3/0625 |
| 2018/0213684 | A1* | 7/2018 | Bailey | H05K 7/20836 |
| 2018/0306491 | A1* | 10/2018 | Saunders | F25B 49/02 |
| 2019/0346188 | A1* | 11/2019 | Ishiyama | F25B 31/004 |
| 2020/0003441 | A1* | 1/2020 | Brahme | F24F 11/56 |

FOREIGN PATENT DOCUMENTS

EP 3 428 747 A1 1/2019
JP 2000213787 A * 8/2000

* cited by examiner

Primary Examiner — Kun Kai Ma
(74) Attorney, Agent, or Firm — Foley & Lardner LLP

(57) ABSTRACT

A refrigeration cycle including at least one outdoor unit including a plurality of compressors and indoor units each placed in indoor spaces comprises a plurality of compressors for supplying refrigerant to indoor units; and a controller for controlling cooperatively a plurality of the compressors in the outdoor unit to provide a capacity for air-conditioning in the indoor spaces through the indoor units, wherein the controller controls operation of the compressors so as to minimize a cost including start/stop of each compressor by prediction of an air-conditioning requirement in a next time chunk.

10 Claims, 9 Drawing Sheets

REFRIGERATION CYCLE OPTIMIZATION

TECHNICAL FIELD

The present disclosure relates to optimization of a refrigeration cycle and more particularly relates to optimization of operation for a plurality of compressors in the refrigeration cycle.

BACKGROUND

A VRF system is a system typically including multiple outdoor units (ODUs) and each of ODUs may include a plurality of compressors depending on a particular application. When an ODU includes a plurality of compressors, to control start and/or stop of the compressors becomes a difficult issue, because frequent start/stop of the compressors in low load conditions lowers the operating efficiency of the compressors and wears the equipment while an inrush current may damage motors. Thus, start/stop control of the compressors provides significant contribution to long-term efficiency and costs of the refrigeration cycle such as an air-conditioning system.

In order to address control of the compressors, a variable refrigerant evaporation temperature (VRT) method and an adaptive control method have been used for addressing the frequent start/stop of the compressors. Both methods use the building thermal dynamic to lower a low load stop/start frequency, but by no means, these methods do not always provide the optimal solution to address start/stop control of the compressors.

Start/stop of the compressors requires a binary decision and the number of working compressors become inherently integer such that the optimization problem becomes mathematically a mixed-integer-linear programming (MILP) algorithm. The MILP algorithm has been used to control the refrigeration cycle to address operation of the refrigeration cycle so far. For example, EP 3,428,747 (A1) discloses a refrigeration cycle including a first predictive controller and a second model predictive controller and the second model predictive controller is implemented as a mixed-integer model predictive controller (MI-MPC).

With respect to a technology for lowering operation cost of the refrigerating system, U.S. Pat. No. 7,905,103 B2 discloses usage of a cost function for a refrigeration cycle. The cost function includes number of compressors to be started or to be stopped for the optimal control to achieve cost optimization. The cost values representing the costs required to turn on/off compressors according to the switching sequences are calculated. The compressors are controlled in accordance with the sequence giving the lowest costs.

SUMMARY

Technical Problem

The prior art techniques may address to cost saving of refrigeration cycles, however, EP 3,428,747 (A1) does not consider the cost over a time duration and temperature requirements on air-conditioning. Although U.S. Pat. No. 7,905,103 B2 discloses a cost function taking into account start/stop of a plurality of compressors, U.S. Pat. No. 7,905,103 B2 does not disclose how the cost function should be minimized.

Furthermore, the prior arts disclose independently optimizations by using an MILP solution and the cost function, however, the MILP solution and minimization of the cost function may not satisfy an air-conditioning requirement as is. This means that the prior arts do not consider inherent demands to the refrigeration cycle to provide a comfort condition to human beings and the like.

Solution to Problem

An object of the present invention is to provide a novel refrigeration cycle which attains cost saving while improving degradation of machineries. Also, an object of the present invention is to provide a novel control method and a program executable by a computer which attain cost saving while improving degradation of machineries.

According to one embodiment of the present invention, a refrigeration cycle including at least one outdoor unit including a plurality of compressors and indoor units each placed in indoor spaces comprises a plurality of compressors for supplying refrigerant to indoor units and a controller for controlling cooperatively a plurality of the compressors in the outdoor unit to provide a capacity for air-conditioning in the indoor spaces through the indoor units. In some embodiments, the controller controls operation of the compressors so as to minimize a cost including start/stop of each compressor by prediction of an air-conditioning requirement in a next time chunk.

According to one embodiment, the controller controls the operation of the compressors so as to minimize the cost further including an energy cost and a demand charge for air-conditioning of the indoor spaces.

According to one embodiment, the controller minimizes the cost using a mixed-integer linear programming (MILP) optimization for number and electric power consumption of the compressors.

According to one embodiment, the controller predicts temperature of the indoor space in a next time chunk based on historical data and applies a constraint condition to the predicted temperature upon optimizing by the MILP optimization.

According to one embodiment, the refrigeration cycle is an air-conditioning system for a building.

According to one embodiment, the controller is an embedded controller or at least one functional part is implemented in a server computer networked to the outdoor unit.

Furthermore, according to one embodiment, a method and a program for controlling a refrigeration cycle including at least one outdoor unit including a plurality of compressors and indoor units each placed in indoor spaces are provided.

Advantageous Effects of Invention

According to embodiments of the present invention, a novel refrigeration cycle which attains cost saving while improving degradation of machineries and satisfying a refrigeration demand may be provided. Also, according to embodiments of the present invention, a novel control method and a program executable by a computer which attain cost saving while improving degradation of machineries and satisfying the refrigeration demand may be provided.

DETAILED DESCRIPTION

Specific embodiments of the present invention will now be described with referring to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to limit the invention.

Figure 1:
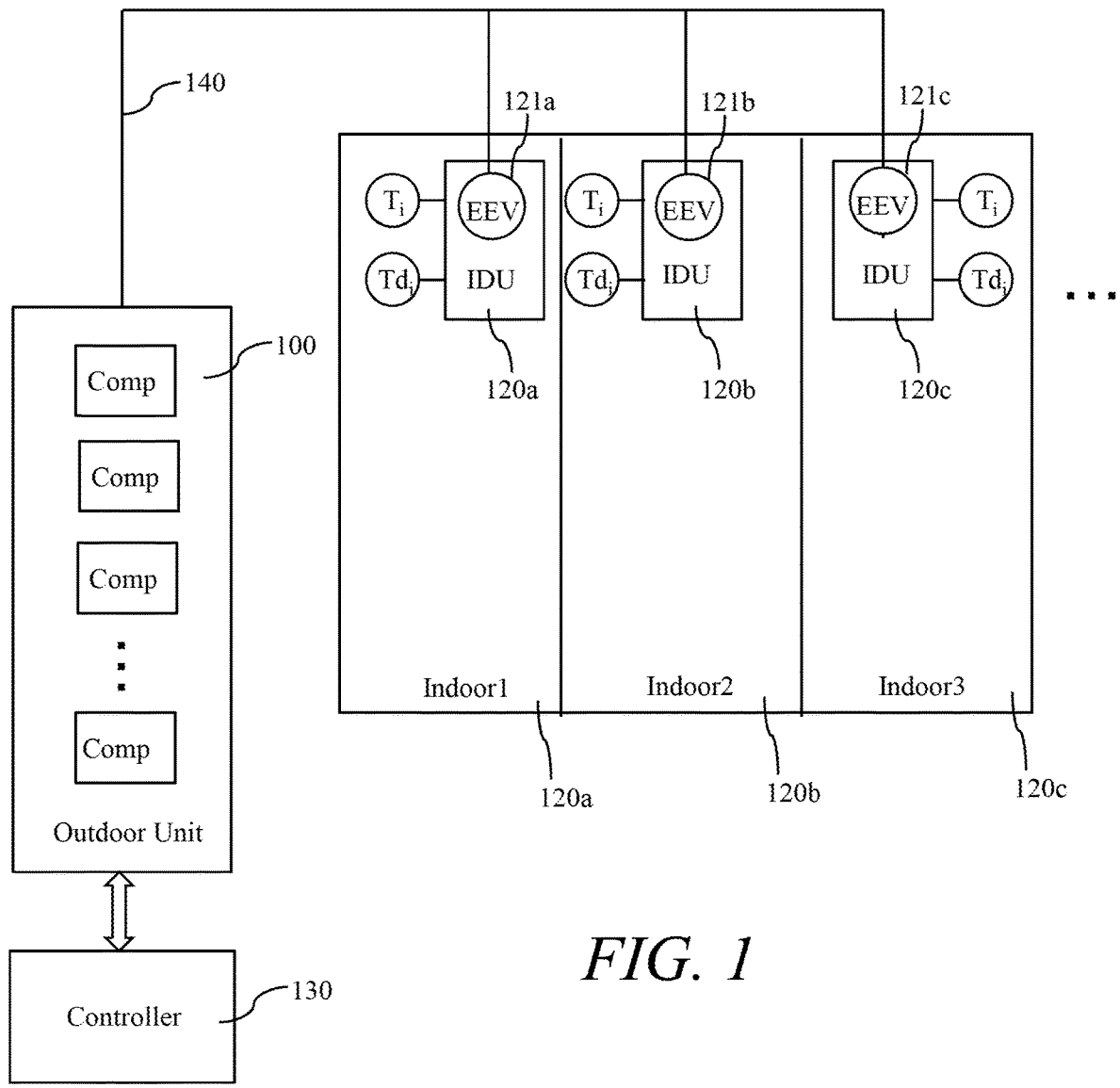
FIG. 1 shows a refrigeration cycle such as an air-conditioning system comprising a refrigerant, according to an exemplary embodiment.

FIG. 1 shows a refrigeration cycle such as an air-conditioning system as one embodiment comprising a refrigerant. The exemplary air-conditioning system may be embodied as an air conditioning apparatus and more preferably may be embodied as a VRF system and the like for servicing the air-conditioning in a building. In this description, as for convenience in description, it is assumed that the refrigerant cycle is implemented in an air-conditioning system constructed as a VRF (variable refrigerant flow) system including at least one outdoor unit (ODU) 100 and a plurality of indoor units (IDUs) 120a, 120b, and 120c.

Although three IDUs are illustrated as an example, more IDUs may be used in the air-conditioning system. A plurality of the IDUs 120a, 120b, and 120c are placed in each of indoor spaces 120a, . . . , 102c and each of the IDUs provides air conditioning of the indoor spaces 120a, . . . , 102c in which the IDU is placed. IDUs are connected to the ODU 100.

In the embodiment, the ODU 100 is shared by a plurality of the IDUs 120a-120c and the ODU 100 supplies refrigerant to IDUs 120a-120c for providing air conditioning of the indoor spaces 120a, . . . , 102c. In the exemplary embodiment in FIG. 1, one ODU 100 is illustrated, however, more ODUs may be of course implemented to the air-conditioning system. The ODU 100 includes a plurality of compressors and the compressors provide required an air-conditioning capacity for the indoor spaces 120a, . . . , 102c. The compressors may be operated cooperatively for generating the required air conditioning capacity by controlling start and/or stop thereof as well as controlling rotation rates of the compressors.

The refrigerant compressed in the ODU is supplied through piping 140 to each of the indoor units (IDU) 120a, . . . , 120c. In each of the IDU 120a, . . . , 102c, an electronic expansion valve (EEV) 121a, 121b, and 121c is disposed to control individually the air-conditioning capacity. Furthermore, each of the IUDs 120a, . . . , 120c is disposed with a temperature sensor $T_i$ and a temperature sensor $Td_i$. The temperature sensor $T_i$ detects temperature in the i-th indoor space and the temperature sensor $Td_i$ detects discharge temperature from the IDU to the i-th indoor space.

The ODU 100 is controlled by a controller 130 and the controller 130 controls operation conditions of the copressors for providing the optimal capacity of the ODU 100 taking into account machinery requirements and electrical power consumption requirements. The controller 130 also controls other devices such as a for-way valve (not shown) and the like, however, control of the other devices is not purpose of this invention so that more descriptions will be provided herein.

Since the capacities of the compressors may be controlled in a pseudo analog way by using digitally controlled inverter, start and/or stop of the compressor is controlled digitally between on and off so called as on/off switching. If all of the parameters are handled in the continuous values, the control of a plurality of the compressors can be optimized by using conventional linear programming problem. When considering the binary character of start and/or stop of the compressors, the optimum control of the ODU may be handled by using a mixed-integer linear programming (MILP) problem.

Figure 2:
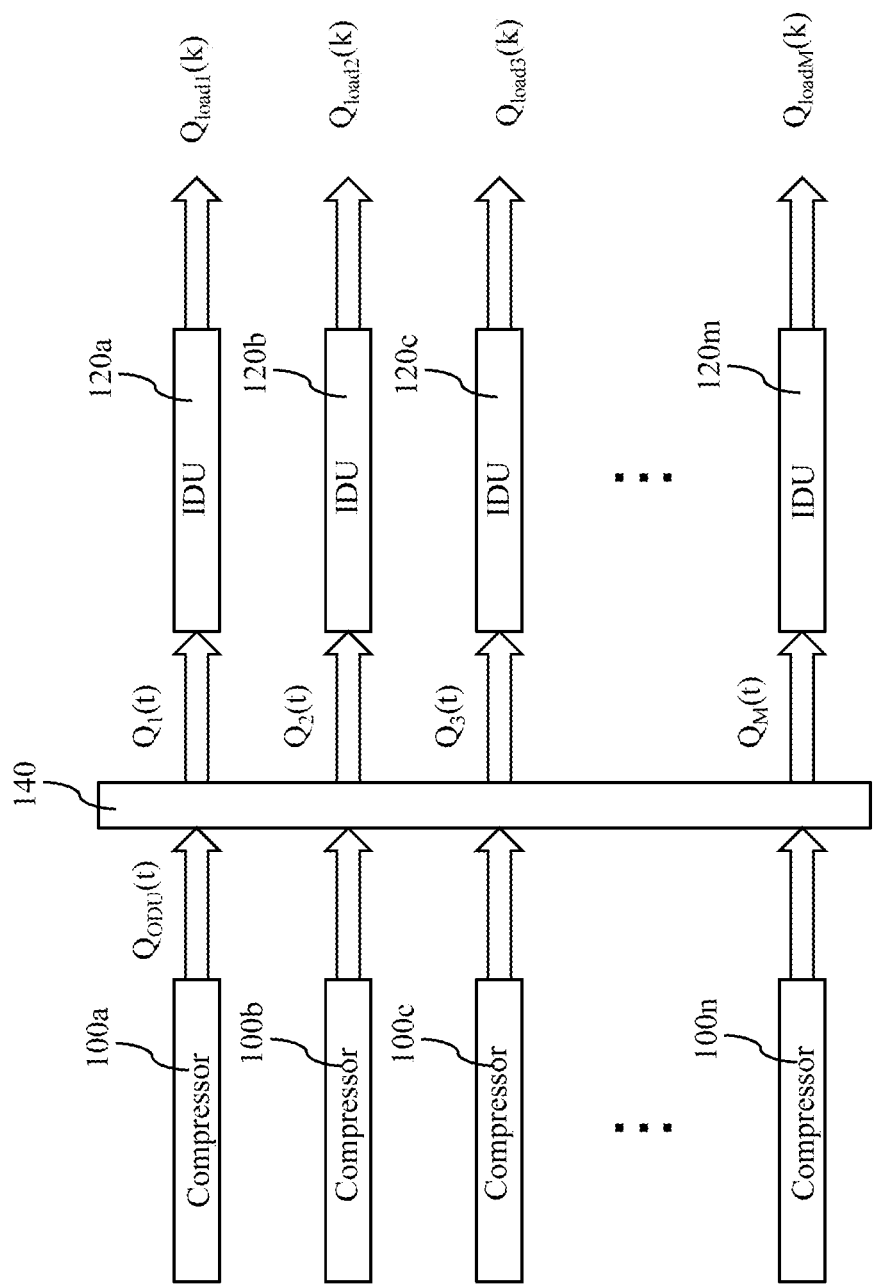
FIG. 2 shows a control scheme of the air-conditioning system comprising the ODU 100 to which a plurality of the compressors is implemented, according to an exemplary embodiment.

FIG. 2 shows a control scheme of the air-conditioning system comprising the ODU 100 to which a plurality of the compressors is implemented. The N compressors 100a, . . . , 100n are operated as a group cooperatively and generate the total capacity $Q_{ODU}$ (k). Here, the parameter "k" means time during operation of the air-conditioning system and preferably, the parameter "k" defines a time chunk having a predetermined time length during the operation of the air-conditioning system.

There is no substantial limitation on the time length of the time chunks and the time length of the time chunk may be determined depending on a particular application from several minutes, for example fifteen minutes to several hours.

The compressors 100a, . . . , 100n supply the refrigerant having the capacity QODU (k) through the piping 140 and the refrigerant having the air conditioning capacity Q1 (k), . . . , QM(k) is distributed to M IDUs 120a, . . . , 120m preferably through the EEV depending on requirement of the air-conditioning requirement in the indoor spaces $Q_{load1}$, . . . , $Q_{loadM}$ in which each of the IDUs are placed. The IDUs performs air conditioning of the indoor spaces 120 by heat exchange with indoor air and the refrigerant to achieve air conditioning and a plurality of IDUs may be placed in the same indoor space.

Figure 3:
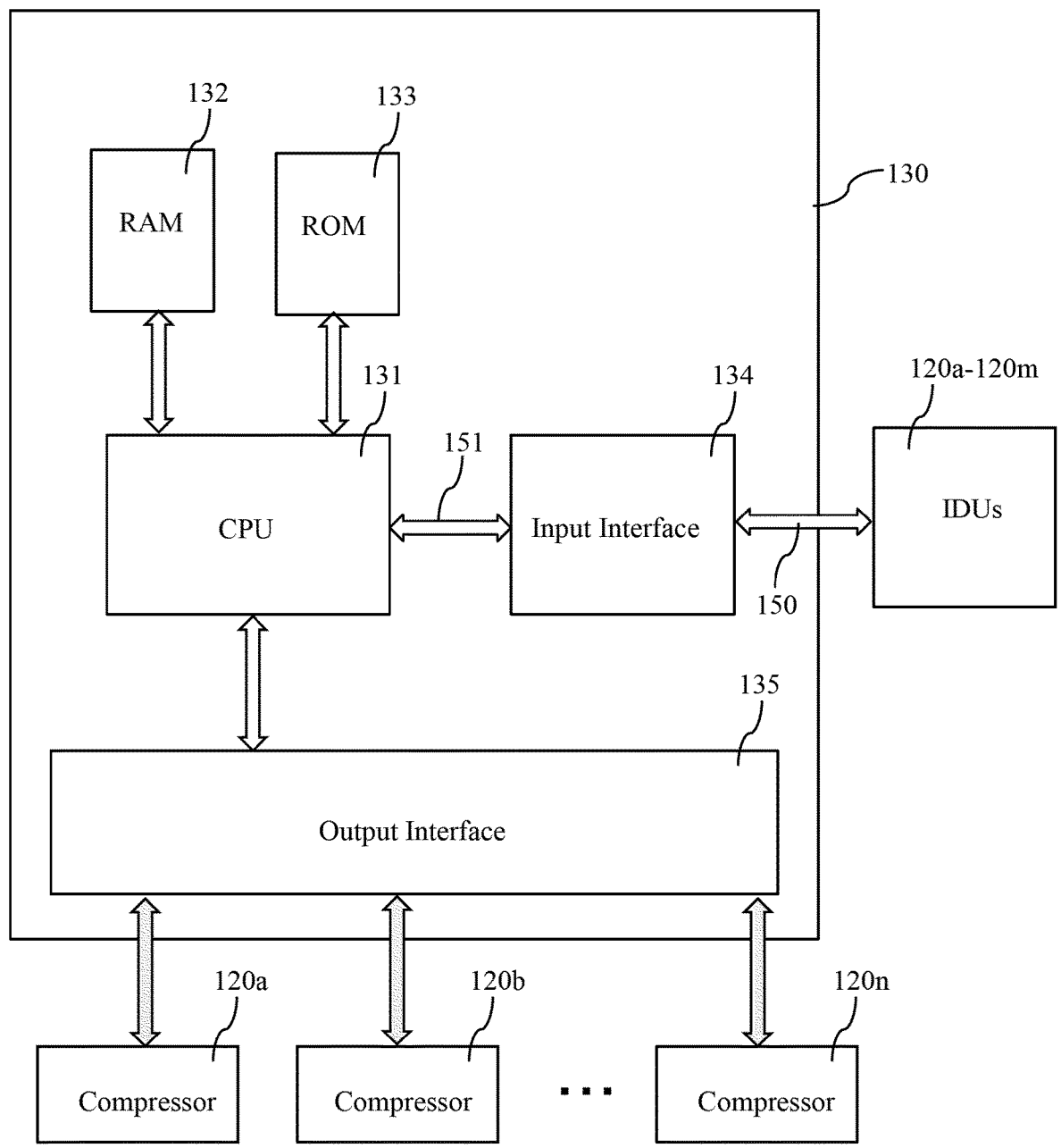
FIG. 3 shows an embodiment of a hardware construction of the controller 130, according to an exemplary embodiment.

FIG. 3 shows an embodiment of a hardware construction of the controller 130. The hardware construction illustrated in FIG. 3 describes mere example and the functional parts may be distributed among a plurality of information processing apparatus such as a server through a network or a so-called cloud system.

In one embodiment, the controller 130 is implemented as a controller board on which various electronics are implemented and the controller board may be disposed inside of the ODU 100. As exemplarily illustrated, the controller 130 comprises a CPU 131, a RAM 132, and a ROM 133. The RAM 132 is a temporal memory for storing various data and provides a working space of the CPU 131. The RAM 132 may be implemented as a separated memory device as depicted in FIG. 3, however, register memories implemented in the CPU 131 may be used in place of and/or together with the RAM 132. The ROM 132 is a non-volatile memory and stores various programs and data for performing air conditioning processing such as historical data for operating the compressors, detected temperatures by sensors and the like. As the RAM 132 and the ROM 133 may be disposed separately from the CPU 131, however, the RAM 132 and the ROM 133 may be implemented an inside module of the CPU 330.

The CPU 131 may be implemented as a microcomputer and into the CPU 131, data from every IDUs 120a, ..., 120m are input through the communication line 150 through an input interface 134 and also an I/O bus 151 for monitoring operation condition of the IDUs 120a, ..., 120m and feeding back the data to the control.

The data sent from the IDUs 120a, ..., 120m may be input temperature and output temperature of each IDU, however other data may be sent from the IDUs depending on particular applications. In one embodiment, the CPU 131 may be implemented a client peripheral which is operated by a remote server (not shown). The remote server may be placed at a remote data center or a management office and the remote server may control the controller 130 to attain required air conditioning.

The CPU 131 processes the data and generates instructions to control the compressors 120a, ..., 120n to achieve the optimal operation of the compressors. In one embodiment, the CPU 131 determines the optimal operation of the compressors 120 using an MILP solver so as to address start/stop of the compressors as well as the electric power consumption of the compressors while ensuring the air-condition requirement rather than satisfying the cost requirements. The CPU 131 sends instructions to respective inverters through an output interface 135 to control the compressors 120a, ..., 120n.

Figure 4:
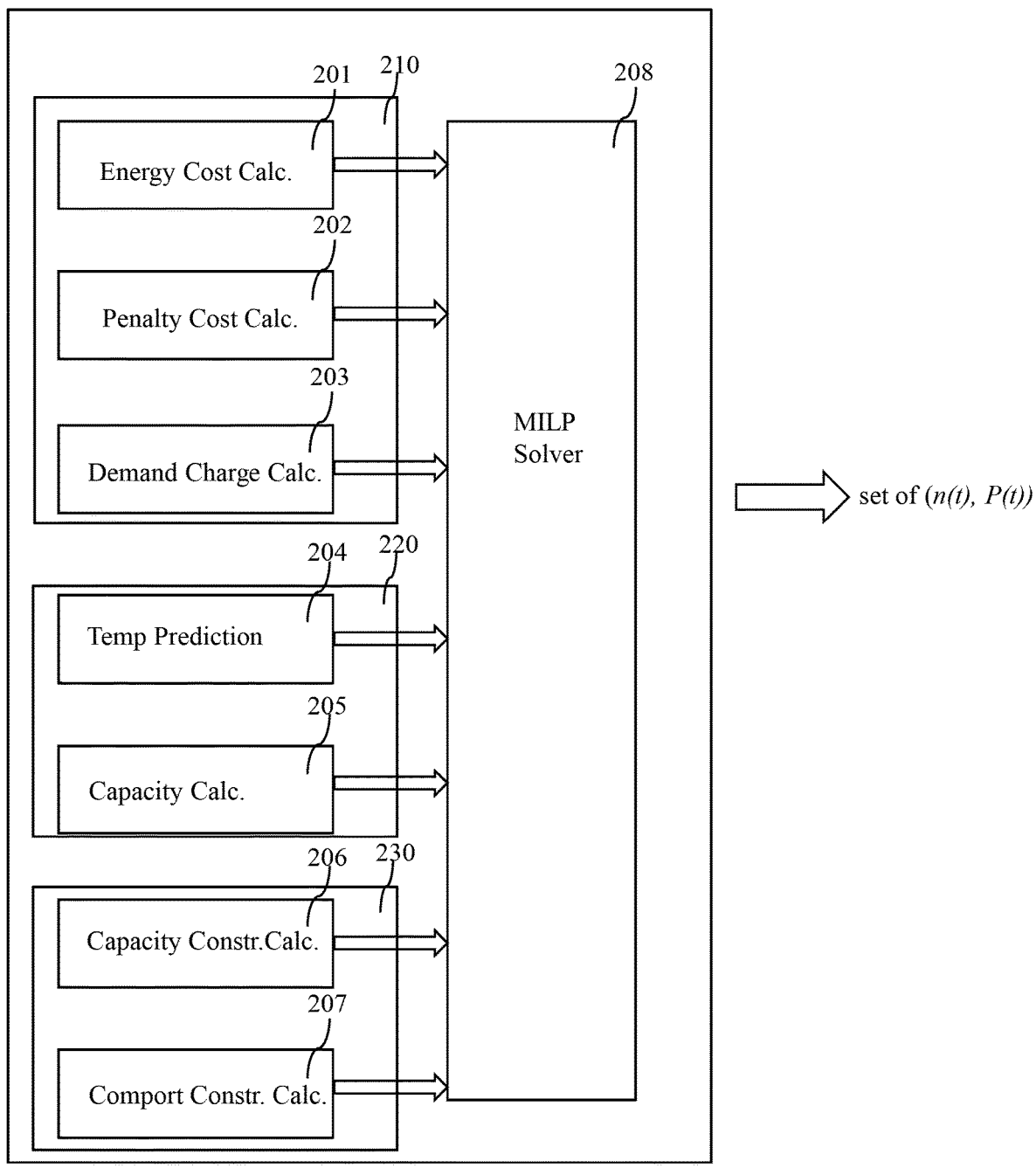
FIG. 4 shows one embodiment of a functional construction of the controller 130, according to an exemplary embodiment.

FIG. 4 shows one embodiment of a functional construction of the controller 130 relating to an embodiment of the present invention. The functional construction in FIG. 4 is realized by making the CPU 131 retrieve a computer executable program stored in the RAM 132 and the like and also execute the retrieved computer executable instructions. In another embodiment, the functional elements shown in FIG. 4 may be implemented as the functional parts of the remote server.

Now referring to FIG. 4, the functional parts will be explained. The functional parts generally classified into a cost calculation module 210, a zone modeling module 220, and a constraint calculation module 230.

The cost calculation module 210 includes functional parts for calculating the cost functionfthat is an object function to be minimized. The zone modeling module 220 calculates temperature modeling of the zone such as the indoor spaces depending on ambient temperature and a particular air-conditioning requirement of the zone. The constraint calculation module 230 calculates various constraint conditions and in FIG. 4, a capacity constraint calculation part and a comfort constraint calculation part are exemplarily illustrated.

The capacity constraint condition can be used to omit sets of the number of compressors n (k) and electric power consumption P that cannot be attained in a particular air-conditioning system for improving scalability of MILP optimization. The comfort constraint is also expressed as a temperature constraint and is an important constraint condition when the MILP optimization is implemented in the air-conditioning system considering objective of the air-conditioning system to provide the comfort temperature and/or humidity condition to human beings and the like. Since the MILP optimization determines the number of the compressors and the electrical power consumption of each compressor, MILP solutions without the comfort constraint will not satisfy with regard to an air-conditioning purpose.

Now, details of the functional modules will be described herein below. The cost calculation module 210 comprises an energy cost calculation part 201, a penalty cost calculation part 202, and a demand charge calculation part 203. The energy cost calculation part 201 calculates costs of electric power consumption from an electric price depending on the electronic power consumption of the compressors included in the ODU 100.

[Eq. 1]

$$\text{Energy Cost}(k) = C_{electricity} \times n(k) \times P(k) \qquad (1)$$

wherein $C_{electricity}$ is a constant for the electric power consumption at given operation number n (k) of the compressor within the time chunk "k" and the variable "P (k)" is the electric power consumption of the compressors represented by, for example, in Wattage.

The penalty cost calculation part 202 computes costs of start and/or stop of the compressors. The costs of start and/or stop of the compressors means the cost of frequent start/stop operation of the compressor in low load conditions to increase electric power consumption and machinery costs such as wears of parts as well as damages by inrush currents to motors. These costs may be historically or empirically determined.

With respect to the penalty cost for start/stop of the compressors, the following approximation may be used.

[Eq 2]

$$\text{Penalty}(k) = |n(k) - n(k-1)| \times C_{change} \qquad (2)$$

wherein Penalty (k) is a penalty cost for start/stop of the compressors at the time chunk k and $C_{change}$ is a constant determined beforehand from empirically and historically and also interpreted for example in Wattage.

Furthermore, according to an embodiment, the demand charge calculation part 203 computes sir conditioning demands is incorporated as the following approximation:

[Eq. 3]

$$\text{Demand Charge}(k) = \text{Energy Cost }(k) \times \text{Electrical Charge per Wattage} \qquad (3)$$

wherein Energy cost (k) is a basic electric power cost in the time chunk k and Electrical Charge per Wattage is an electrical charge depending on a contraction between a user and an electric power supplier depending on amounts of electric power used.

The above definitions of the cost values provide a cost function Jof one embodiment as follows:

[Eq. 4]

$$J = \sum_{k=0}^{h} [(\text{Energy Cost}(k) + \text{Petalty}(k)] + (\text{Demand Charge}(k)) \qquad (4)$$

wherein J is a cost function and the variable "h" is the number of chunks at a targeted control duration.

The above cost function means that the cost function targets to minimize the cost over the operational duration the air-conditioning system historically with predicting the cost required in the next time chunk k, however, other strategy may be adopted so long as the total cost will be minimized.

Here, the controller 130 controls the operation of the compressors 100a, ..., 100n to minimize the cost function J and predicts parallel the operation conditions in the next time chunk so as to feed back the results of the prediction to the compressor operation in the next time chunk.

Furthermore, the zone modeling module 220 comprises a temperature estimation part 204 and a capacity calculation part 205. The temperature estimation part 204 predicts temperature of the next time chunk $T_i$ (t) to be resulted by change in the compressor operation using the following Eq. (5).
[Eq. 5]

$$T_i(k)=T_i(k-1)+C_i\times(Q_i(k)+Q_{load,i}(k)) \quad (5)$$

wherein $T_i$ (k) is predicted temperature of the i-th indoor space in the next time chunk k, $C_i$ is a constant, and $Q_{load,i}$ (k) is a zone load of the indoor space "i" in the next time chunk k. $Q_{load,i}$ (k) may be obtained by a zone model derived from the historical data of the subjected zone as well as weather, occupancies and other variables. The $Q_{load,i}$ (k) may be predicted by, for example, moving average using the above variables.

Furthermore, in a particular embodiment, $Q_i$ (k) may be defined by the following Eq. (6):
[Eq. 6]

$$Q_i(k)=F(\text{FanSpeed}_i(k), T_i(k), Td_i(k)) \quad (6)$$

wherein F is a function of an input capacity to the $IDU_i$, $\text{FanSpeed}_i$ (k) is indoor fan speed, and $Td_i$ (k) is discharge air temperature of the $IDU_i$, $Q_i$ (k) may be predicted by historical data of $Q_i$ (k) and the prediction of $Q_i$ (k) may be done such as moving average of the past values of the time chunk k.

The capacity calculation part 205 calculates the total output capacity of the ODU 100 in the next time chunk and defined by Eq. (7):
[Eq. 7]

$$Q_{ODU}(k)=f(P(k), T_{amb})\times P(k)\times n(k) \quad (7)$$

wherein $Q_{ODU}$ (k) is the total output capacity of the ODU 100, $f(P(t), T_{amb})$ is an equipment function of the air-conditioning system, P(k) is electric power consumption in the next time chunk, and n (k) is the number of the compressors operated in the next time chunk.

In one embodiment, ambient temperature may be obtained from weather forecast data and the length of the time chunk may be set to an interval that the weather forecast data will be updated. In another embodiment, the ambient temperature may be predicted by historical data detected by the air-conditioning system. The prediction of the ambient temperature may preferably be obtained by an adequate method such as moving average of the past ambient temperatures of each chunk so as to predict the ambient temperature in the next chunk.

The value of QODU (t) is equal to the capacity input into the IDUs 120a, ..., 120m given by Eq. (8):

[Eq. 8]

$$Q_{ODU}(t) = \sum_{i=1}^{m} Q_i(k) \quad (8)$$

The above values are used as the parameters in an MILP computation. The MILP computation requires constraint conditions to optimize the cost function J and the constraint conditions used in an embodiment are a capacity constraint and a comfort constraint. The controller 130 comprises a capacity constraint calculator 206 and a comfort constraint calculator 207. The capacity constraint calculator calculates an upper limit of the air-conditioning capacity provided by the ODU 100 and the capacity constraint is calculated by using the following Eq. (9):
[Eq. 9]

$$n(k)\times P(k)\leq \text{Total compressor}\times P_{max} \quad (9)$$

wherein Total Compressor is the number of compressors included in the ODU 100 and $P_{max}$ is the maximum electrical power consumed by each of the compressors. Hence the capacity constraint may omit the solutions bot attained in the equipment condition from the MILP optimization.

Another constraint is the comfort constraint, i.e., temperature constraint and may be calculated by the following Eq. (10).
[Eq. 10]

$$T_{low}(k)\leq T_i(k)\leq T_{high}(k) \quad (10)$$

wherein $T_{low}$ (k) is a lower temperature limit and $T_{high}$ (k) is a higher temperature limit in the i-th indoor space. The comfort constraint may omit the meaningless solutions obtained only by considering the cost from the MILP computation. If the comfort constraint is not used, the MILP optimization optimizes the costs without regarding the air-conditioning requirement.

The controller 130 further comprises a MILP solver 208 and any MILP solver 208 commercially available may be used. Alternatively, the MILP solver 208 may be implemented by computer programming accommodated to a particular air-conditioning system. Further another embodiment, the MILP solver 208 may be implemented in a remote server through the network such as Internet and the remote server may provide services to each of individual air-conditioning systems as CLOUD SERVICE.

In the embodiments that the system is implemented as CLOUD SERVICE, the functional parts 201-207 may be implemented in the individual air-conditioning systems and send their computation results or detected values to the server and the server performs the MILP computation for the particular air-conditioning system such as the building air-conditioning system and then returns the result of the MILP optimization as a set or vector (n(k), P(k)) to the individual air-conditioning system so as to attain management of the air-conditioning system. The CPU 131 in the individual building air-conditioning system will control the compressors according to the vector (n(k), P(k)) by sending the instructions to the inverters for controlling the compressors.

Figure 5:
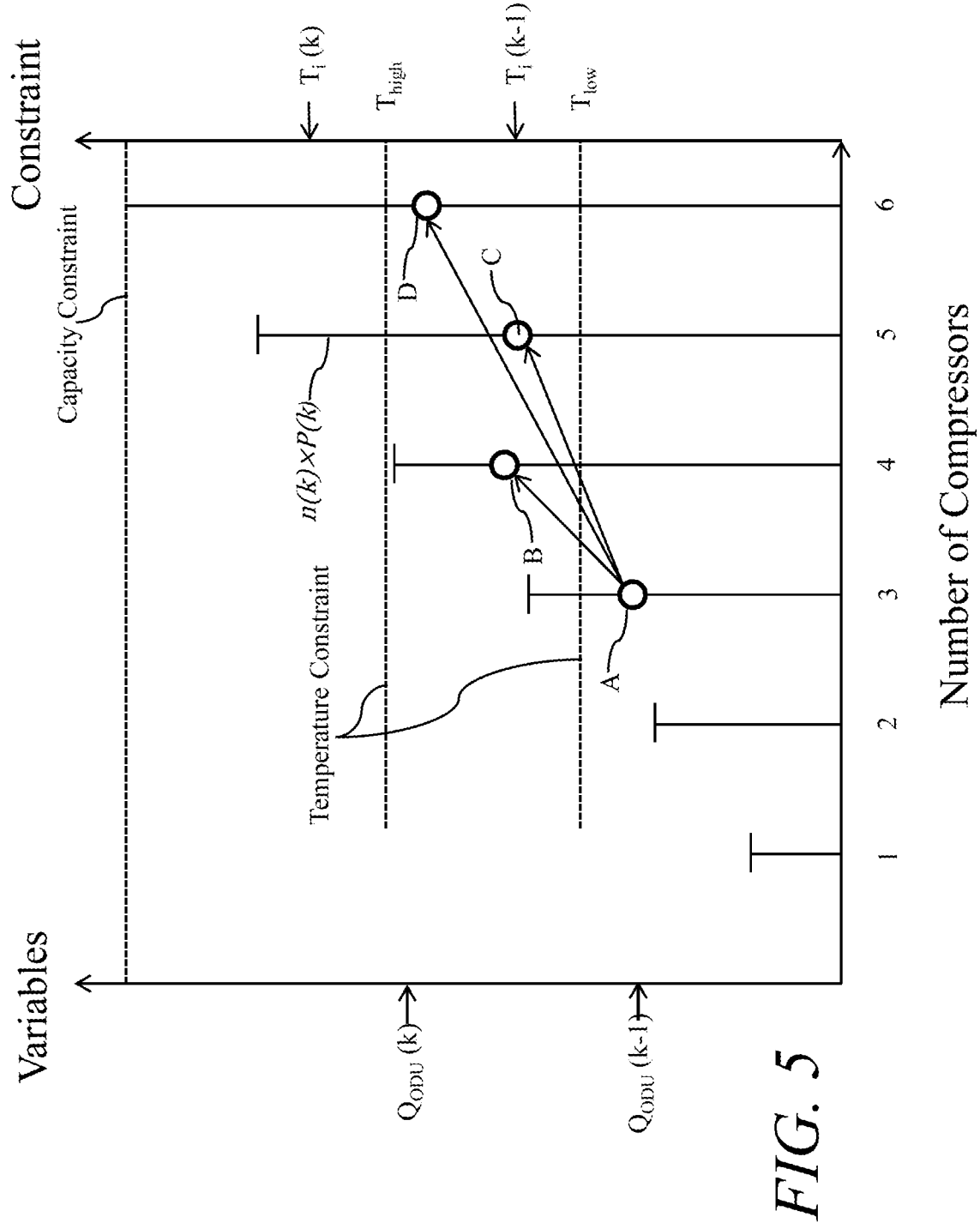
FIG. 5 shows a variable-constraint diagram of the MILP computation, according to an exemplary embodiment.

Now with referring to FIG. 5, strategy for performing the MILP optimization will be schematically explained. FIG. 5 shows a variable-constraint diagram of the MILP computation of an exemplary embodiment. The ordinate at the left side represents a variable QODU (k) and the ordinate at the right side represents the constraints. The abscissa represents the number of compressors operated or to be operated and bars on the compressor number represent the maximum possible electric power consumption. In the MILP computation according to an embodiment, independent variables are the number of compressors (integer) and the electrical power consumption, i.e., n(k) and P (k), and the variables QODU (k), $T_i$ (k) and the like are variables predicted by ambient temperature and/or historical data during the operation of the air-conditioning system.

The strategy for optimizing the cost function (target function) is to determine a vector (n (k), P (k)) that provides the minimum cost while satisfying the air-conditioning requirements. Now, it is assumed that the air-conditioning system is operated in the time chunk (k−1) at a point A with three compressors and the electric power consumption P (k−1) producing the compressor capacity QODU (k−1). In FIG. 5, the points from A to D represent the conditions providing the solution vector (n (k), P (k)) and the circles represent the electric power providing the optimal operation condition determined by the MILP optimization.

Schematically, the controller 130 determines whether or not temperature in the i-th indoor space at the next time chunk $T_i(t)$ to be within the temperature constraint. If temperature in the i-th chunk $T_i(t)$ is within the temperature constraint, the controller 130 does not change the current operation condition in the next time chunk k and sets the current vector (n (k−1), P (k−1)) as the vector (n(k), P (k)) in the next time chunk k. However, if temperature in the i-th indoor space at the next time chunk $T_i(k)$ will be out of the temperature constraint the controller 130 determines the vector (n(k), P(k)) that satisfying the comfort, i.e., temperature constraint, the capacity constraint with new $Q_{OUD}(k)$ predicted by the capacity calculation part 205 so as to minimize the cost function J provided in Eq. (4).

Here, the value of new $Q_{ODU}(k)$ can be provided by the vector (n(k), P(k)) represented by points from B to D in which the number of the operated compressors are different, and the controller 130 invokes the MILP solver 208 to determine which point from B to D gives the minimum cost provided by Eq. (4) while satisfying the constraints requirement. Although FIG. 5 illustrates the embodiment where the number of the compressors is to be increased, similar strategy will be applied when the number of the compressors is to be decreased. As described above, incorporating the comfort constraint, unnecessary MILP calculations will be avoided while satisfying the air-conditioning requirement.

In the vector A, $Q_{ODU}(k-1)$ is provided at the minimum cost. When the prediction of $T_i(k)$ in the time chunk k instructs that the air-conditioning system must increase its total refrigeration capacity, there are two optimization strategies; a first one is to increase the capacity of compressors while keeping the number of compressors and second one is to change the number of the compressors so as to provide the necessary capacity. The controller 130 determines which condition provides the minimum cost using the MILP calculation to determine the vectors (n (k), P (k)) which are represented by the vectors from B to D.

In addition, even if the necessary capacity can be obtained with the same number of compressors currently operated, there may be the case that the cost function J would be decreased nevertheless increasing the number of the compressors to be operated, because operation condition will be lowered beyond the penalty of start of another compressor. In this instance, the controller 130 optimizes the number of compressors to be operated in the next time chunk k using the MILP optimization considering trade-off between the penalty of start/stop of the compressors and electric power consumption.

In an embodiment, scalability of the MILP optimization may be improved with excluding useless vectors (n, P) that will not satisfy the cost minimization such that the scalability of the MILP optimization.

Figure 6:
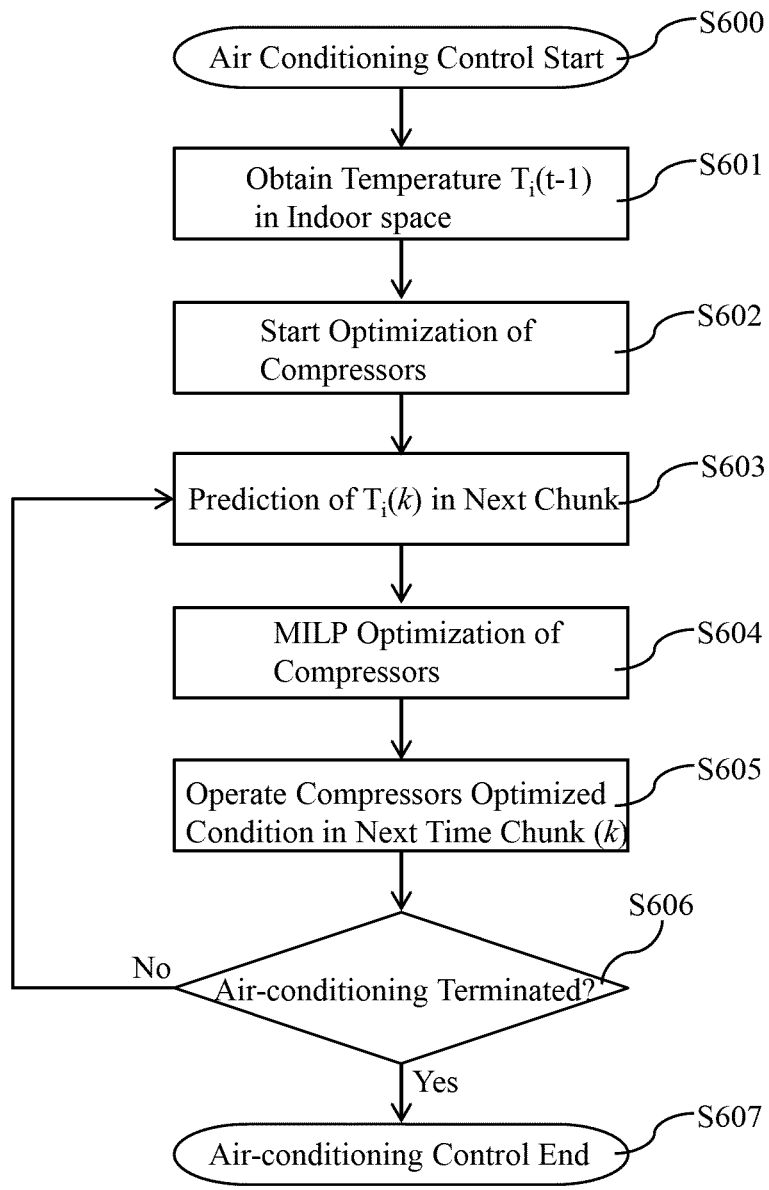
FIG. 6 shows one embodiment of a flow chart for processing of the air-conditioning system, according to an exemplary embodiment

Now referring to FIG. 6-FIG. 8, processing executed by the controller 130 will be explained. FIG. 6 shows one embodiment of a flow chart for processing of the air-conditioning system. Processing of the air conditioning starts from S600 and obtains temperature T (k−1) in the i-th indoor space in step S601. In step S602, the controller 130 starts the MILP optimization of the compressors 100a, ..., 100n according to an embodiment of the present invention. In step S603, the controller 130 performs prediction of $Q_{ODU}(k)$ and $T_i(k)$ in the next time chunk k. In step S604, the controller 130 performs the MILP optimization of the compressors to achieve the optimized operation of the air-conditioning system.

Then, in step S605, the controller 130 operates the compressors in the optimized condition in the next time chunk k according to determined vector (n(k), P(k)) with supplying necessary air-conditioning capacity to each of the IDUs 120a, ..., 120m by adjusting opening of EEVs, fan speeds and other operating condition. The processing of the controller 130 will be continued until the air-conditioning system is terminated and if the operation of the air-conditioning system is not terminated (S606: No), the processing reverted to step S603 to continue the control using the MILP optimization.

When the air conditioning system is terminated (S606: Yes), the air-conditioning system will be terminated and in step S607, the controller 130 stops the control of the air-conditioning system. The processing in FIG. 6 may control the air-conditioning system using the MILP optimization from the start of the air-conditioning system to the termination of the system while optimizing the operation cost based on the prediction and the MILP optimization.

Figure 7:
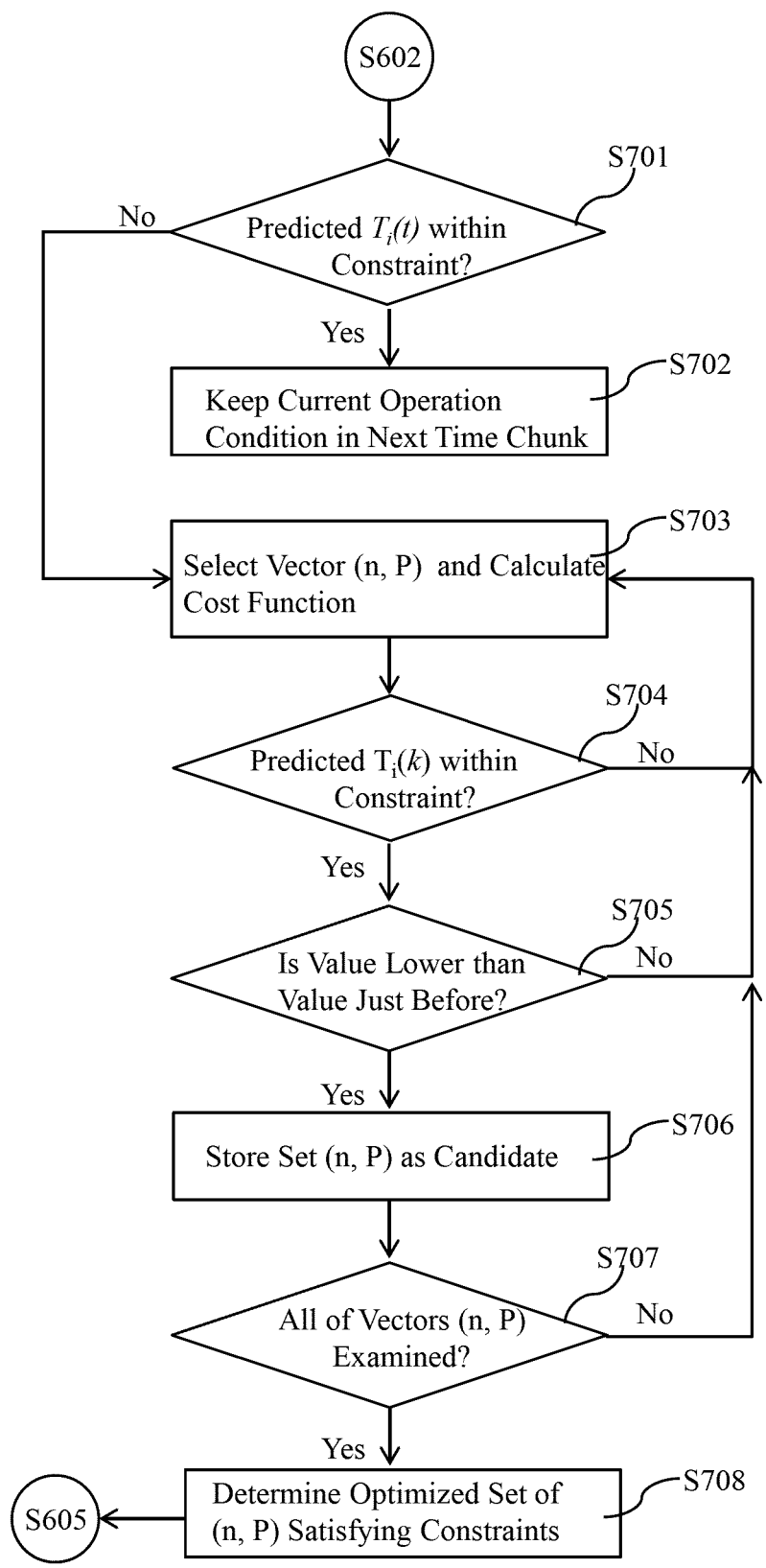
FIG. 7 shows one embodiment of a flow chart for detailed processing of the prediction processing of step S602, according to an exemplary embodiment

FIG. 7 shows one embodiment of a flow chart for detailed processing of the prediction processing of step S602. The MILP optimization starts after the control has passed from step S602 and in step S701, the process determines whether or not the predicted $T_i(k)$ in the next time chunk k will be within the comfort constraint and if so (S702: Yes), current operation condition is kept in the next time chunk k. If the determination in step S701 returns negative result (S701: No), the process diverts to step S703 and select another vector (n, P) and calculate the cost function using the MILP optimization.

In step S704, the process determines whether or not the predicted $T_i(k)$ is within the comfort constraint is made. If not so (S704: No), the process reverts to step S703 and performs calculation using another vector (n, P). If the determination in step S704 returns an affirmative result (S704: Yes), the process further determines whether or not the calculated cost value is lower than the value just before. If so (S705: Yes), the process stores the current vector (n, P) as the candidate for the operation condition in the next time chunk k in step S706. If the determination in step S705 returns the negative result (S705: No), the process reverts to step S703 to search another set.

The process further determines whether or not all of the vectors (n, P) has been examined and if not so (S707: No), the process reverts to step S703 to repeat examination of remained sets and the determination in step S707 returns the affirmative result (S707: Yes), the process determines the vector (n, P) providing the minimum cost while satisfying the comfort constrain as the operation condition in the next time chunk k. Then, the process returns the control thereof to step S605 to perform the control of the air-conditioning system.

The selection step of the vector (n, P) may be done by a round-robin search or a branch- and bound search. When the number of compressors and indoor spaces are relatively less, simple round robin search may be used. If the round robin search is used, there are trivial vectors which may be excluded from the optimization. Such trivial vectors are, for example, the vectors that cannot supply the air conditioning capacity compared to the vector (n(k−1) and P(k−1)) considering predicted temperature $T_i(k)$ and so on.

Figure 8:
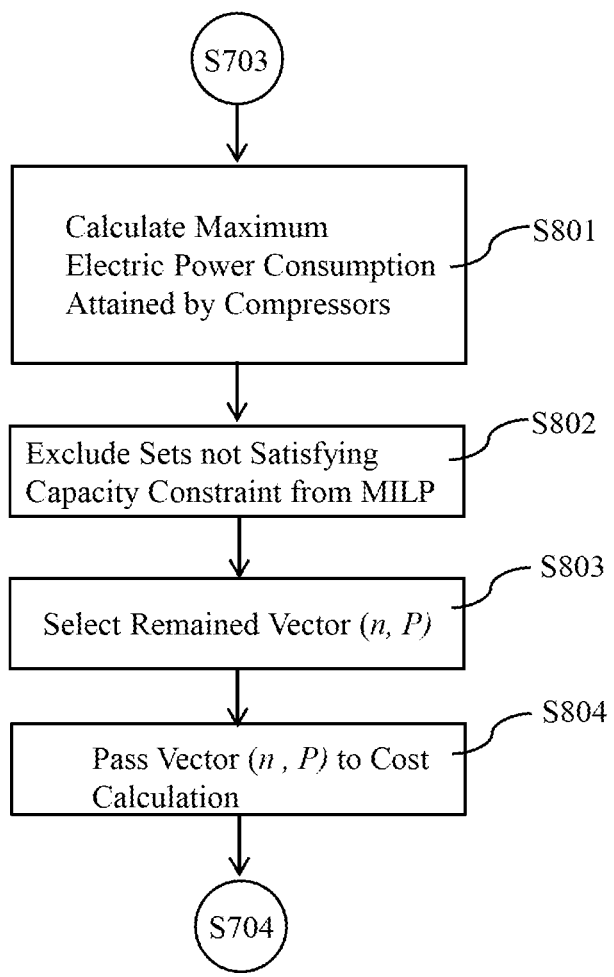
FIG. 8 shows one example of a flow chart for excluding the trivial vectors that do not satisfy the required capacity for saving computation resources while further improving scalability of the air conditioning control, according to an exemplary embodiment.

FIG. 8 shows one example of a flow chart for excluding the trivial vectors that do not satisfy the required capacity for saving computation resources while further improving scalability of the air conditioning control. The process of FIG. 8 may be incorporated in step S703 and the control is passed from step S701. In step S801, the controller 130 calculates the maximum electric power consumption attained by the number of the compressors in the refrigeration cycle. In step S802, the controller 130 excludes the vectors not satisfying the capacity requirement from MILP optimization and starts the MILP optimization with respect to remained sets.

In step S803, the controller 130 selects the remained vector (n, P) and then the controller passes the selected vector (n, P) t the cost calculation module 210. Then, the controller 130 returns the control to step S704 in FIG. 7 to continue the control of the air-conditioning system. When the air-conditioning system includes a plurality of the ODUs, the above optimization may be applied to each of the ODUs and this procedure will become more effective when the air-conditioning system includes much ODUs including a plurality of compressors.

Figure 9:
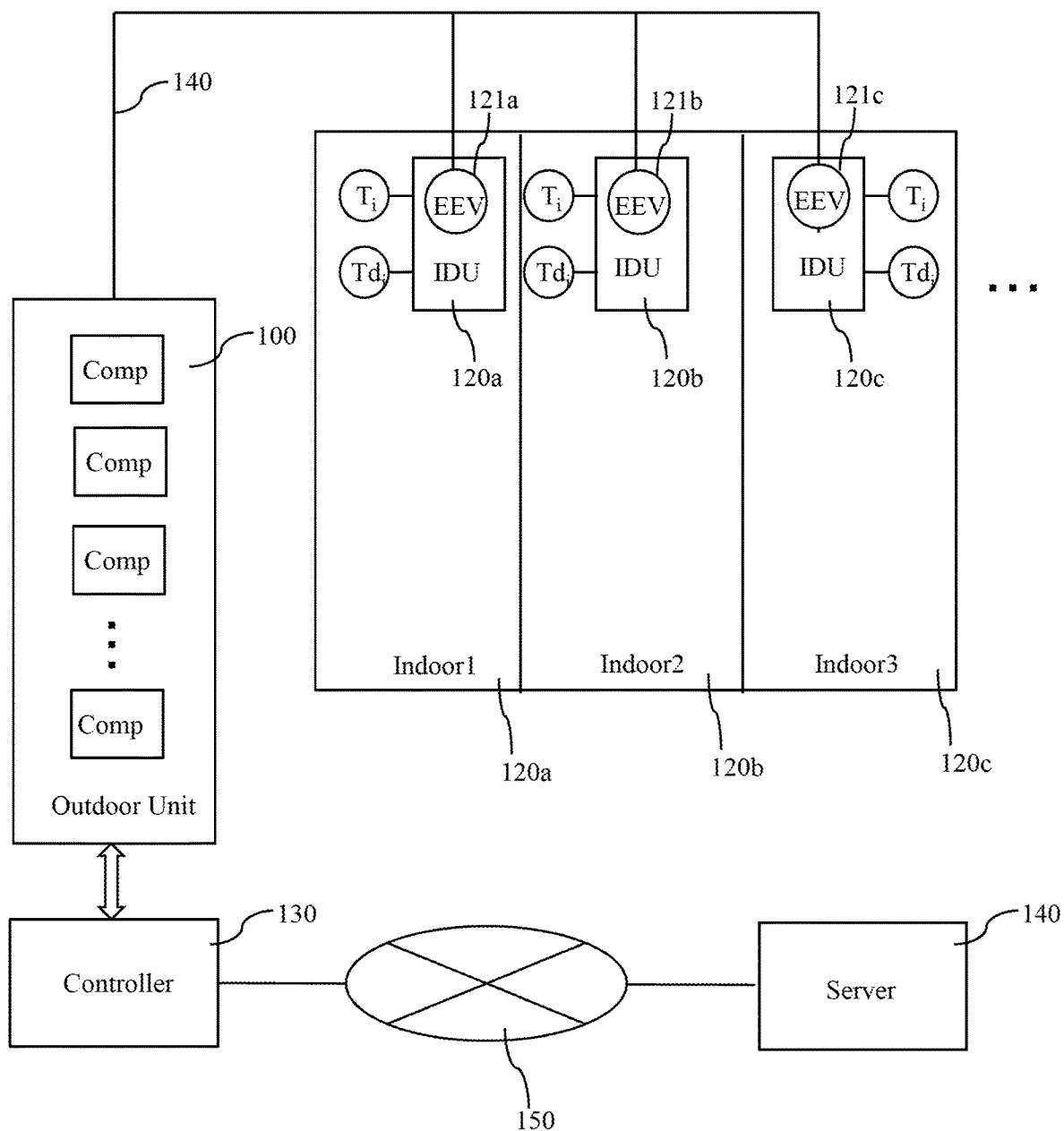
FIG. 9 shows another embodiment of the air-conditioning system, according to an exemplary embodiment.

FIG. 9 shows another embodiment of the air-conditioning system and in the embodiment shown in FIG. 9, the controller 130 comprises a communication module for communicating to the server 140 through a network 150. In this embodiment, the controller 130 applies itself to control the ODU 100 and the IDU 120a, . . . , 120n with receiving the vector (n (k), P (k)) from the server 140 and operates the compressors and the like according to the vector (n (k), P (k)).

Instead of receiving the vector (n (k), P (k)) from the server 140, the controller 130 does not include the functional modules and functional parts shown in FIG. 4 and the functional modules and functional parts may be implemented into modules of the server 140. The server 140 receives the data from the controller 130 and performs prediction and the MILP optimization to determine the vector (n (k), P (k)) for the air-conditioning system and to control the air-conditioning system according to the embodiment.

In this embodiment, the conventional air-conditioning system comprising a plurality of compressors cooperatively operated to serve air-conditioning may be updated according to the present embodiment with the minimum cost with adding the communication module to the controller 130. Furthermore, the server 140 may control parallel and individually a plurality of air-conditioning systems connected through the network 150. This embodiment may improve controllability of the air-conditioning systems while minimizing running costs of the air-conditioning systems such that the total cost for serving air-conditioning may be lowered.

As set forth so far, preferred embodiments of the present invention have been described, the present invention should not be limited to particular relating embodiments, and various modifications and alternations may be made by those having ordinary skill in the art without departing scope of the present invention and the true scope should be determined only by appended claims.

What is claimed is:

1. A refrigeration cycle comprising:
   one or more indoor units located in indoor spaces;
   one or more outdoor units comprising a plurality of compressors for supplying refrigerant to the indoor units; and
   a controller for controlling cooperatively the plurality of compressors in the outdoor units to provide a capacity for air-conditioning in the indoor spaces through the indoor units;
   wherein the controller controls operation of the plurality of compressors so as to minimize a cost including start/stop of each compressor by prediction of an air-conditioning requirement in a next time chunk and the controller minimizes the cost using a mixed-integer linear programming (MILP) optimization for number and electric power consumption of the plurality of compressors by predicting temperature of the indoor space in the next time chunk based on historical data and applying a constraint condition to the predicted temperature upon optimizing by the MILP optimization.

2. The refrigeration cycle of claim 1, wherein the cost comprises an energy cost and a demand charge for air-conditioning of the indoor spaces.

3. The refrigeration cycle of claim 1, wherein the refrigeration cycle is an air-conditioning system for a building.

4. The refrigeration cycle of claim 1, wherein the controller is an embedded controller or at least one functional part is implemented in a server computer networked to the outdoor units.

5. A method for controlling a refrigeration cycle including one or more outdoor units including a plurality of compressors and one or more indoor units located in indoor spaces, the method comprising:
   predicting a capacity of the refrigeration cycle generated by the outdoor units and a temperature of an indoor space air-conditioned by the refrigeration cycle based on historical operating data of the refrigeration cycle;
   minimizing a cost using number of the plurality of compressors and electric power consumption as independent variables subject to a temperature constraint condition for the indoor space;
   determining a set of the number of compressors to be operated and the electric power consumption for the plurality of compressors in a next time chunk;
   operating the plurality of compressors in the determined set in the next time chunk;
   determining whether a predicted temperature of the indoor space satisfies the temperature constraint condition; and
   in response to the predicted temperature of the indoor space predicted does not satisfy the temperature constraint condition, executing a mixed-integer linear programming (MILP) optimization until the set of the number of the plurality of compressors to be operated and the electric power consumption satisfies the temperature constraint condition.

6. The method of claim 5, further comprising:
   in response to the predicted temperature of the indoor space satisfies the temperature constraint condition, exiting the MILP optimization and setting the set of the number of the plurality of compressors to be operated and the electric power consumption as an operation condition in the next time chunk.

7. The method of claim 5, further comprising:
   excluding sets not satisfying a capacity constraint from the MILP optimization; and
   excluding sets not satisfying the temperature constraint condition from the MILP optimization so as to improve the MILP optimization.

8. One or more non-transitory computer-readable storage media storing instructions that, when executed by one or more processors, cause the one or more processors to control an air-conditioning system by performing operations comprising:

predicting a capacity of a refrigeration cycle generated by an outdoor unit including a plurality of compressors and temperature of an indoor space air-conditioned by the refrigeration cycle based on historical operating data of the refrigeration cycle;

minimizing a cost using a number of the plurality of compressors and electric power consumption as independent variables subject to a temperature constraint condition for the indoor space;

determining a set of the number of compressors to be operated and the electric power consumption for the plurality of compressors in a next time chunk;

operating the plurality of compressors in the determined set in the next time chunk;

determining whether a predicted temperature of the indoor space satisfies the temperature constraint condition; and if the predicted temperature of the indoor space does not satisfy the temperature constraint condition, executing a mixed-integer linear programming (MILP) optimization until the set of the number of the plurality of compressors to be operated and the electric power consumption satisfies the temperature constraint condition.

9. The non-transitory computer-readable storage media of claim 8, the operations further comprising:

if the predicted temperature of the indoor space satisfies the temperature constraint condition, exiting the MILP optimization and setting the set of the number of the plurality of compressors to be operated and the electric power consumption as an operation condition in the next time chunk.

10. The non-transitory computer-readable storage media of claim 8, the operations further comprising:

excluding sets not satisfying a capacity constraint from the MILP optimization; and excluding sets not satisfying the temperature constraint condition from the MILP optimization so as to improve scalability of the MILP optimization.

\* \* \* \* \*